March 18, 1952 C. G. MONTGOMERY 2,589,843

ULTRAHIGH-FREQUENCY MIXING CIRCUITS

Filed Jan. 3, 1946 2 SHEETS—SHEET 1

*INVENTOR.*
CAROL G. MONTGOMERY
*BY*
William D. Hall
ATTORNEY

INVENTOR.
CAROL G. MONTGOMERY
BY
William D. Hall.
ATTORNEY

Patented Mar. 18, 1952 2,589,843

UNITED STATES PATENT OFFICE 2,589,843

ULTRAHIGH-FREQUENCY MIXING CIRCUITS

Carol G. Montgomery, Belmont, Mass., assignor, by mesne assignments, to the United States of America as represented by the Secretary of War Application January 3, 1946, Serial No. 638,886

5 Claims. (Cl. 250—20)

This invention relates generally to electrical apparatus involving ultra-high and microwave frequency energy and more particularly to frequency mixing circuits for use at these frequencies.

According to conventional usage, many radio receivers, such as used in broadcast, communication, or radar systems, employ the superheterodyne principle. In receivers which employ the superheterodyne principle, a local oscillator signal is combined in a mixing circuit with the incoming or received signal to produce a third or intermediate frequency signal. Many receivers, especially those used in communication and radar systems, have high sensitivity, and in these receivers noise becomes an especially important factor. One common source of noise is the local oscillator. This noise results from the combination in the mixing circuit of signals of two or more frequencies which are present in the local oscillator signal. Another source of noise is that which is picked up by the antenna of the receiver. Signals having frequencies other than the frequency of the desired signal will combine in the mixing circuit with signals from the local oscillator and with other signals picked up by the antenna to produce undesirable noise.

Another characteristic of conventional mixing circuits used heretofore is that energy from the local oscillator is coupled to the circuit associated with the antenna, and as a result, the local oscillator signal is radiated by the antenna. In most applications of radio, either civilian or military, such coupling of energy from one source into another source is highly undesirable.

Apparatus known as a magic-T which is hereinafter described functions in a manner to overcome or obviate disadvantages heretofore encountered in signal mixers.

The magic-T is an electrical device having four terminal pairs in the instance of a network, or four branches in the instance of a wave guide structure. Hereinafter described in terms of a wave guide structure having four branches, the magic-T possesses many advantages which will become apparent from the following partial list of its characteristics:

(1) If the first and second branches are terminated in their characteristic impedances and energy is supplied to a third branch, energy is present in equal magnitude and in phase at the first and second branches. No energy appears at the fourth branch.

(2) If under the conditions stated in (1) above, energy is supplied to the fourth branch rather than to the third, energy is present at the first and second branches in equal magnitude and out of phase. No energy appears at the third branch.

(3) The converse of the characteristics set forth in (1) and (2) above are true. If energy is supplied to the first and second branches, energy is present at the third and fourth branches in respective magnitudes which are dependent upon the relative phase of the energy at the first and second branches.

(4) If energy is supplied to either the first or second branch, energy is present at the third and fourth branches. No energy appears at the remaining second or first branch.

Several structures embodying magic-T's are disclosed in the copending applications of Robert H. Dicke: Serial No. 584,226, filed March 22, 1945, now Patent No. 2,547,378 granted April 3, 1951; and Serial No. 586,413, filed April 3, 1945.

It is an object of the present invention to provide apparatus for combining energy from two sources in such a manner that the resulting intermediate frequency energy output does not contain components which would ordinarily be produced by combination of energy of two frequencies originating in one of the energy sources.

Another object of this invention is to provide a mixing circuit wherein signal energy and local oscillator energy may be combined without causing radiation of energy which originated in the local oscillator.

It is a further object of the present invention to provide a structure equivalent in result, though different in form and principle of operation, to a magic-T; that is, which has the characteristics set forth above and which is simple in construction.

The mixing circuit of the present invention employs a section of wave guide in which two modes of transmission are simultaneously present. A first coupling means is connected to the wave guide section in a manner to be electromagnetically coupled to said section for energy in one of said modes and to be essentially decoupled electromagnetically from said section for energy in the other of said modes. A second coupling means is connected to the wave guide section in a manner to be electromagnetically coupled to said section for energy in the other of said modes and to be essentially decoupled from said section for energy in said one mode. The first and second coupling means correspond to the third and fourth branches of the magic-T as described above.

A pair of coupling means are oriented in the wave guide section in positions and in a way such that they are both electromagnetically coupled to said guide section for the energy in one of said modes in the same phase and for the energy in the other of said modes in 180° phase opposition. These latter coupling means correspond to the first and second branches of the magic-T as described above.

For a better understanding of the invention, together with other and further objects thereof, reference is had to the following description taken in connection with the accompanying drawings in which.

Figure 1:
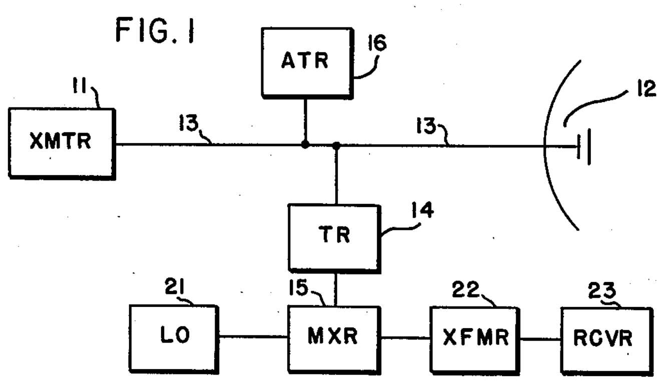
Fig. 1 is a block diagram of a radar or radio object-locating system in which the present invention may be utilized.

Reference is now had to the drawings and more particularly to Fig. 1 thereof wherein is illustrated in block diagram form a radio object-locating system in which the present invention may be utilized, comprising a transmitter 11 which feeds an antenna or other radiating device 12 through a suitable transmission line 13. Energy is coupled from the transmission line 13 through a transmit-receive (TR) device 14 to a mixer 15. The TR device 14 is essentially an amplitude discriminator which prevents transmitted signals, which are of greater amplitude than received signals, from reaching the mixer 15 in which the present invention is embodied. An anti-transmit-receive (ATR) device 16 is connected to the transmission line 13 at a position between the transmitter 11 and the TR device 14. The position of the ATR device 16 is such as to insure that a maximum amount of the received signals from the antenna 12 pass into the TR device 14 and mixer 15. A local oscillator 21 feeds a signal to the mixer 15. The output of the mixer 15 is connected to transformer coupling means 22 and thence to a receiver 23 containing the remainder of the system receiver which normally includes such components as amplifiers, a detector, and an indicator.

In the operation of the system of Fig. 1, a signal from the transmitter 11 is radiated by the antenna 12. Signals received by the antenna 12 pass through the TR device 14 to the mixer 15 wherein they are combined with a signal from the local oscillator 21 to produce signals at the intermediate frequency. These intermediate frequency signals are amplified, detected and indicated in the conventional manner by the receiver 23.

Figure 2:
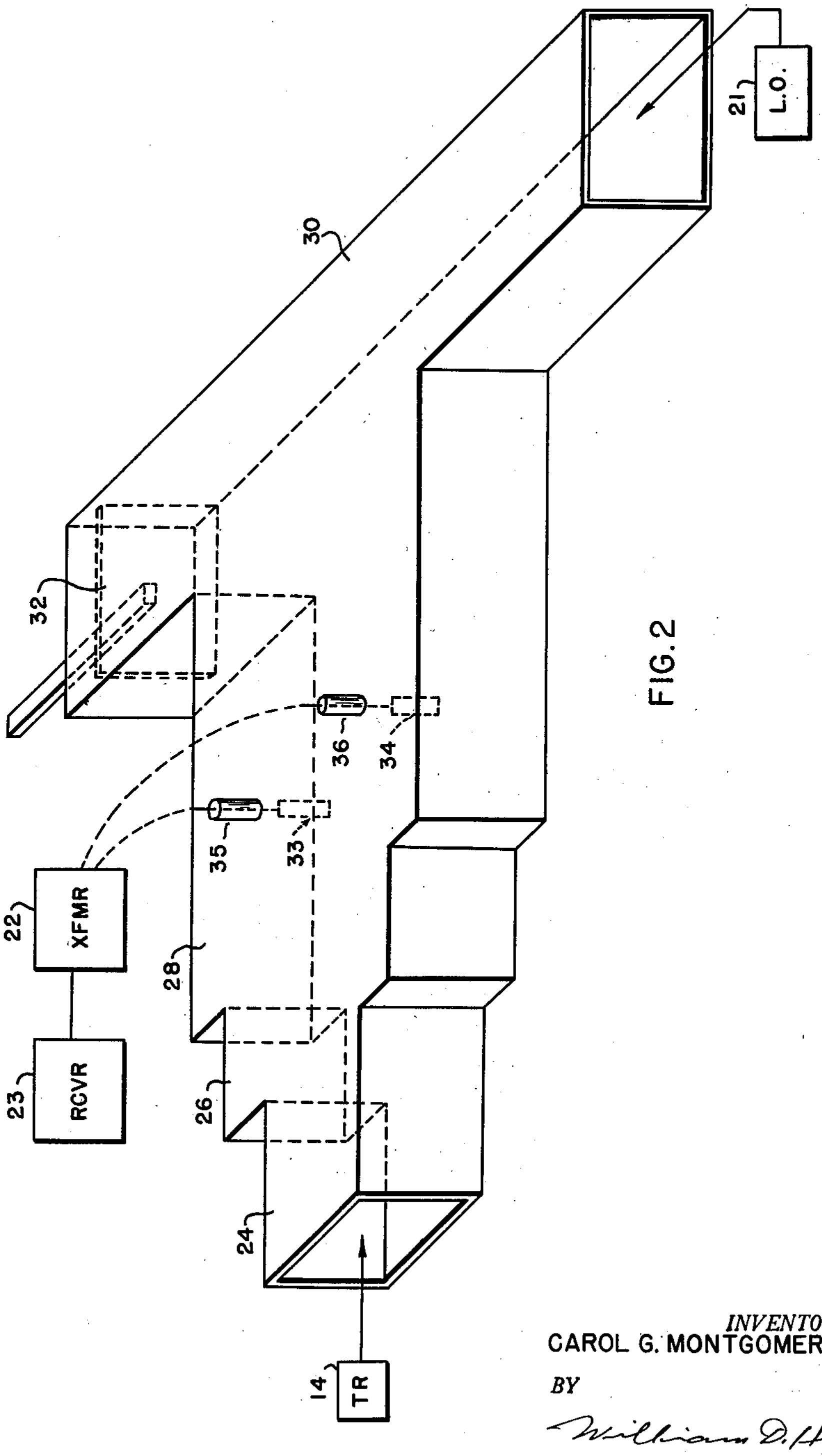
Fig. 2 is an isometric view of the preferred embodiment of the present invention.

Reference is now had to Fig. 2 of the drawings in which there is shown the preferred embodiment of the present invention, which is equivalent to a magic-T mixer and which comprises a section of rectangular wave guide 24 connected to a section of rectangular wave guide 26 which is in turn connected to a third section of rectangular wave guide 28. The mixer here shown is adapted to be used as the mixer 15 of a system as in Fig. 1. In Fig. 2, signal sources and utilization circuits corresponding to those shown in Fig. 1 bear like reference numerals.

The invention utilizes the principle that to transmit the dominant transverse electric mode or the $TE_{0,1}$ mode, the major cross-sectional dimension of the rectangular wave guide need be only equal to or greater than one-half wavelength as measured at the operating frequency. To transmit the next higher transverse electric mode or the $TE_{0,2}$ mode, the major cross-sectional dimension must be equal to or greater than a whole wavelength.

Referring again to Fig. 2, the wave guide 24 is designed to operate in the dominant or $TE_{0,1}$ mode, and should therefore have a major cross-sectional dimension which is between the limits of one-half and one wavelength as measured at the mid-operating frequency. The wave guide 28 is designed to operate in the next higher transverse electric mode or the $TE_{0,2}$ mode, and its major cross-sectional dimension is therefore between the limits of one wavelength and one and one-half wavelengths. Wave guide 28 may then also be excited in a $TE_{0,1}$ mode. The section of wave guide 26 is an odd number of quarter wavelengths long, and acts as a coupling or matching transformer between wave guides 24 and 28. Wave guide 26 is so designed that its characteristic impedance is the geometric mean of the characteristic impedances of the wave guides 24 and 28. A section of wave guide 30, also designed to operate in the $TE_{0,1}$ mode and not to support the $TE_{0,2}$ mode, is joined to the wave guide 28 in such a manner that a signal propagated in the wave guide 30 in the dominant mode will excite the wave guide 28 in the $TE_{0,2}$. One end of the wave guide 30 is provided with a shorting plunger 32. The position of the plunger 32 may be variable to permit adjustment of the coupling between the wave guide 30 and the wave guide 28. The wave guide 30 is electrically connected to the local oscillator 21. Two detectors 33 and 34 are located within the wave guide 28 at positions between the wave guides 26 and 30. The detectors 33 and 34 are so disposed in a plane perpendicular to the longitudinal axis of the wave guide 28 that they are located at the two maxima of the electric field existing in the wave guide 28 during its operation in the $TE_{0,2}$. The detectors 33 and 34 may be silicon crystals or other suitable devices possessing non-linear voltage-current characteristics. Coaxial leads 35 and 36, associated respectively with the detectors 33 and 34 for applying a signal thereto and for extracting a signal therefrom, may be connected as shown to a transformer 22 which is in turn connected to the receiver 23.

Received signals are coupled into the wave guide 28 from the TR device 14 in such a manner as to excite the $TE_{0,1}$ mode therein. The signals from the TR device 14 thus appear at the detectors 33 and 34 in phase and in equal magnitude. Because of the electrical field considerations involved, no signal in the $TE_{0,2}$ mode is coupled into the wave guide 30; this follows from the fact that guide 30 is coupled to guide 28 over a distance along guide 30 of an odd number of half wavelengths and most energy coupled from the $TE_{0,1}$ mode in guide 28 to guide 30 will cancel itself out. Hence substantially none of the received signal is lost in the local oscillator. The signal from the local oscillator 21 is propagated through wave guide 30 and coupled into the wave guide 28 in such a manner as to excite the wave guide 28 in the $TE_{0,2}$ mode. The electric field configuration of this mode is such that signals originating at the local oscillator 21 will be impressed upon the detectors 33 and 34 in 180 degree phase opposition and in equal magnitude. The $TE_{0,2}$ mode signal in wave guide 28 does not excite the $TE_{0,1}$ mode in wave guide 24 and since guide 24 will not propagate energy in the $TE_{0,2}$ mode, substantially none of the local oscillator signals can be communicated to the TR device 14 and the antenna to cause radiation of the local oscillator signal.

Under the conditions here set forth, namely, that detectors 33 and 34 receive signals in phase from one source and signals in 180 degree phase opposition from a second source, intermediate frequency signals appear on leads 35 and 36 and are in 180 degree phase opposition if the detectors 33 and 34 are symmetrically connected to coaxial leads 35 and 36, respectively. If the detectors 33 and 34 are asymmetrically connected to their respective coaxial leads, the intermediate frequency signals will be in phase and they may be directly combined. In the embodiment here described, the intermediate frequency signals from the detectors 33 and 34 are out of phase and are combined in the transformer 22. The transformer 22 may be a half-wavelength section of transmission line; one intermediate frequency signal may be applied to such a section of transmission line, and the resulting phase-reversed signal is then directly combined with the other intermediate frequency signal. Many other devices for combining signals are known in the art. Transformer 22 may, for example, be of the conventional air-core type.

When signals from a single source combine at the detectors to produce undesired noise, the phase of the intermediate frequency output noise will be such that, regardless of the type of transformer used, the noise signals will be cancelled out.

In Fig. 2, the positions of the local oscillator 21 and the TR device 14 may be interchanged if desired. That is, the TR device 14 may be coupled into wave guide 30 instead of into wave guide 24, and the local oscillator 21 may be coupled into wave guide 24 instead of into wave guide 30. Another modification is that in which local oscillator 21 and TR device 14 are connected to couple energy into wave guide 28 at the points at which the detectors 33 and 34 are shown in Fig. 2, and the detectors 33 and 34 are then appropriately placed in the wave guides 24 and 30, respectively. Therefore, although Fig. 2 illustrates the preferred embodiment of the present invention, the invention is not to be construed to be limited to the particular arrangement shown and described herein in detail.

Figure 3:
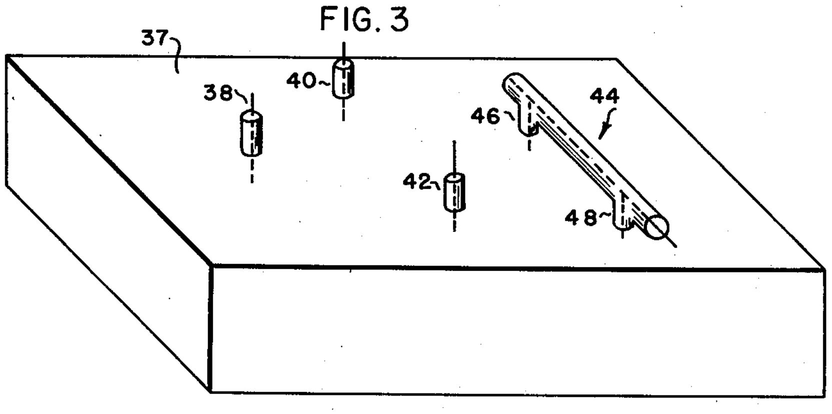
Fig. 3 is an isometric view of a simplified structure corresponding to the embodiment shown in Fig. 2.

Reference is now had to Fig. 3 which is an isometric view of a simplified structure corresponding to that shown in Fig. 2, comprising a section of wave guide 37 to which there are connected coupling probes 38, 40, and 42. The probes 38, 40 and 42 may be replaced by coupling loops or any other coupling means well known in the art. The wave guide 37 is terminated at both ends in its characteristic impedance, and is designed to operate in both the $TE_{0,1}$ and $TE_{0,2}$ modes.

The probe 38 is located near one end of the wave guide 37 for excitation of the wave guide in the $TE_{0,1}$ mode. The coupling probes 40 and 42 are disposed in a plane perpendicular to the longitudinal axis of the wave guide 37, and at maxima of the electric field set up in the wave guide 37 during its excitation in the $TE_{0,2}$ mode. A composite coupling 44 is connected to the wave guide 37 and comprises two coupling probes 46 and 48 which are located at electric field maxima of the $TE_{0,2}$ mode. The probes 46 and 48 are electrically connected together by a section of coaxial transmission line, the electrical length of which is an odd number of half wavelengths.

Probes 40 and 42 correspond to the probes 35 and 36 of Fig. 2. Probe 38 corresponds to the wave guide 24, and the composite coupling 44 corresponds to the wave guide 30 shown in the magic-T structure of Fig. 2. The relative placement of the probes 38, 40, 42, and composite coupling 44 along the longitudinal axis of the wave guide 37 is immaterial. Therefore, although the probes 40 and 42 are shown between the probe 38 and composite coupling 44 in the simplified magic-T of Fig. 3, the invention is not to be so limited.

Figure 4:
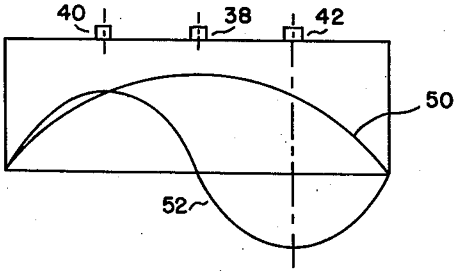
Fig. 4 is a schematic illustration of the electric field distribution within the structure of Fig. 3.

A signal applied to the coupling probe 38 excites the wave guide 37 in the $TE_{0,1}$ mode. The $TE_{0,1}$ mode electric field distribution within the wave guide 37, as seen in a plane or planes parallel to that containing probes 40 and 42, is substantially as shown by the curve 50 of Fig. 4. In Fig. 4 are also shown the relative lateral positions of probes 38, 40 and 42. Probes 46 and 48 lie directly behind probes 40 and 42, respectively, and are therefore here hidden from view. Referring now to Figs. 3 and 4, the field strength and signals at the probes 40 and 42 due to a signal applied at probe 38 are seen to be equal and in phase. The signal set up in the wave guide by the probe 38 also induces signals in the probes 46 and 48 which are equal in magnitude and in phase, but because the coaxial line connecting probes 46 and 48 has a length equal to an odd number of electrical half wavelengths, the resultant signal output from the composite coupling 44 is zero. This condition will be recognized as conforming to characteristic (1) of a magic-T as listed above.

A signal which is fed to the composite coupling 44 causes out of phase voltages at probes 46 and 48 and excitation of the wave guide 37 in the $TE_{0,2}$ mode, because of the odd number of electrical half wavelengths by which the probes 46 and 48 are separated. This can more readily be seen by reference to Fig. 4 in which the curve 52 represents the electric field distribution for the $TE_{0,2}$ mode. The corresponding signals at the probes 40 and 42 will be equal in magnitude and out of phase. The signal picked up by the probe 38 will be zero because the electric field distribution for the $TE_{0,2}$ mode passes through zero at this point. The structure of Fig. 3 thus further operates in accordance with characteristic (2) of a magic-T as listed above.

A signal applied to either the probe 40 or 42 excites the wave guide 37 in both the $TE_{0,1}$ and $TE_{0,2}$ modes. The electric field distributions of the $TE_{0,1}$ and $TE_{0,2}$ modes are represented by the curves 50 and 52, respectively, in Fig. 4, for the instance in which a signal is applied to the probe 40. From Fig. 4 it is seen that the magnitude of the electric field at the remaining probe 42 due to the $TE_{0,1}$ mode is equal but opposite in polarity to the magnitude of the electric field due to the $TE_{0,2}$ mode, and thus no signal appears at the remaining probe 42. Since both the $TE_{0,1}$ and $TE_{0,2}$ modes are excited in the wave guide 37, the signal is coupled into both the probe 38 and the composite coupling 44. This corresponds to characteristic (4) of a magic-T as listed above.

Signals to both probes 40 and 42 excite the wave guide 37 in one or both of the modes $TE_{0,1}$ and $TE_{0,2}$. The relative amplitudes of the two modes excited will be dependent upon the relative phases of the signals applied to the probes 40 and 42, and, therefore, the signals which appear at probe 38 and composite coupling 44 are dependent upon the relative phase of the signals at the probes 40 and 42. This latter characteristic thus corresponds to characteristic (3) of a magic-T as listed above.

The simplified structure shown in Fig. 3, corresponding to the structure of Fig. 2, and the accompanying explanatory diagram of Fig. 4 have here been described for the purpose of providing a simplified explanation of the manner in which the mixer embodying my invention functions.

While there has been described what is at present considered to be the preferred embodiment of the invention, it will be obvious to those skilled in the art that various changes and modifications may be made therein without departing from the invention.

What is claimed is:

1. In a receiver of the superheterodyne type, a mixing circuit for combining a received radio frequency signal with a local oscillator radio frequency signal to provide an intermediate frequency signal, said mixing circuit comprising a rectangular wave guide, means positioned in said wave guide for exciting said wave guide in the $TE_{0,1}$ mode with the received signal, means positioned in said wave guide for exciting said wave guide in the $TE_{0,2}$ mode with the local oscillator signal, first and second detector means so positioned in said wave guide as to be excited in phase by said received signal and in 180 degree phase opposition by said local oscillator signal and means for combining the output of said first and second detector means to provide an intermediate frequency signal.

2. A mixing circuit comprising a section of rectangular wave guide adapted to propagate signals in the $TE_{0,1}$ and $TE_{0,2}$ modes, first means for coupling a signal into said wave guide in such a manner as to excite the $TE_{0,1}$ mode therein, second means for coupling a signal into said wave guide in such a manner as to excite the $TE_{0,2}$ mode therein, and third and fourth means for coupling signals from said wave guide which are excited by both the $TE_{0,1}$ and $TE_{0,2}$ modes, said third and fourth coupling means being disposed in a plane perpendicular to the longitudinal axis of said wave guide and being positioned in said plane at respective maxima of the electrical field configuration when said wave guide is operating in the $TE_{0,2}$ mode.

3. A mixing circuit for obtaining a beat frequency signal from two high frequency signals comprising a rectangular wave guide designed to propagate the high frequency signals in the $TE_{0,1}$ and the $TE_{0,2}$ modes, means coupled to said guide for exciting said guide with one of said high frequency signals in the $TE_{0,1}$ mode, means coupled to said guide for exciting said guide with the other of said high frequency signals in the $TE_{0,2}$ mode, a pair of detector means each coupled to said guide in a manner to be excited by said one signal in phase and by said other signal in 180° phase opposition, and means coupling the output circuits of said detector means together in a manner to obtain a beat frequency signal only from the combining of the signals one from each of said exciting means.

4. A mixing circuit for obtaining a beat frequency signal from two high frequency signals comprising a first rectangular wave guide having a major cross-sectional dimension greater than $\lambda$ and less than $3/2\ \lambda$ where $\lambda$ is the average wavelength of said two high frequencies, a second rectangular wave guide for applying one of said high frequency signals to said first wave guide, said second wave guide having a major cross-sectional dimension greater than $\lambda/2$ and less than $\lambda$ and being coupled to substantially the center of one end of said first wave guide, a third wave guide for applying the other of said high frequency signals to said first wave guide, said third wave guide having a major cross-sectional dimension greater than $\lambda/2$ and less than $\lambda$ and being coupled to the other end of said first wave guide at two points spaced substantially an odd number of quarter wavelengths apart along the major cross-sectional axis of said third wave guide and symmetrically with respect to the minor cross-sectional axis thereof, a pair of detectors coupled to said first wave guide in a cross-sectional plane of said first wave guide and at points spaced symmetrically with respect to the minor cross-sectional axis of said first wave guide, and means coupling the outputs of said detectors together in a manner to obtain a beat frequency signal only from the combining of said two high frequency signals.

5. A mixing circuit for obtaining a beat frequency from two high frequency circuits comprising a rectangular wave guide designed to propagate said high frequency signals in at least two different modes of transmission, a first means coupled to said guide in a manner to be electromagnetically coupled thereto for the energy in one of said modes and to be substantially electromagnetically decoupled therefrom for energy in the other of said modes, a second means coupled to said guide in a manner to be electromagnetically coupled thereto for the energy in the other of said modes and to be substantially electromagnetically decoupled therefrom in said one of said modes, third and fourth means coupled to said guide in a manner to be electromagnetically coupled thereto for the energy in said one of said modes in the same phase and for the energy in said other of said modes in 180° phase opposition, fifth means for applying a first high frequency signal in said one mode to said first means, sixth means for applying a second high frequency signal in said other mode to said second means, a first detecting means coupled to said third means, a second detecting means coupled to said fourth means, and output means coupling the output circuits of said detecting means together to obtain a beat frequency signal only from the combining of the signals of said one mode and said other mode.

CAROL G. MONTGOMERY.

REFERENCES CITED

The following references are of record in the file of this patent:

UNITED STATES PATENTS

| Number | Name | Date |
|---|---|---|
| 2,408,420 | Ginzton | Oct. 1, 1946 |